United States Patent
Cole

[11] 3,994,451
[45] Nov. 30, 1976

[54] VARIABLE CAMBER AIRFOIL

[75] Inventor: James B. Cole, Mercer Island, Wash.

[73] Assignee: The Boeing Company, Seattle, Wash.

[22] Filed: Mar. 28, 1974

[21] Appl. No.: 455,837

[52] U.S. Cl. .............................. 244/44; 244/42 DA
[51] Int. Cl.² ............................................. B64C 3/48
[58] Field of Search ......... 244/42 R, 42 CA, 42 CB, 244/42 D, 42 DA, 42 DB, 42 DC, 93, 44; 74/469, 516, 519, 96

[56] References Cited
UNITED STATES PATENTS

| | | | |
|---|---|---|---|
| 1,567,531 | 12/1925 | Magni | 244/44 |
| 1,710,672 | 4/1929 | Banney | 244/44 |
| 1,868,748 | 7/1932 | Hogan | 244/44 |
| 2,679,367 | 5/1954 | Pribil et al. | 74/469 |
| 2,749,060 | 6/1956 | Brady et al. | 244/44 |
| 3,504,870 | 4/1970 | Cole et al. | 244/42 R |
| 3,716,209 | 2/1973 | Pierce | 244/44 |
| 3,836,099 | 9/1974 | O'Neill et al. | 244/44 |

FOREIGN PATENTS OR APPLICATIONS 103,400  1/1917  United Kingdom .................. 244/44

OTHER PUBLICATIONS

"Mechanization and Utilization of Variable Camber in Fightix and Attack Airplanes", Jan., 1973, K. K. Ishimitsu, D180-15377-1.

*Primary Examiner*—Trygve M. Blix
*Assistant Examiner*—Galen L. Barefoot
*Attorney, Agent, or Firm*—H. Gus Hartmann

[57] ABSTRACT

A variable camber apparatus for the leading and/or trailing edge of an airfoil that is operable for lift variation at high airspeeds of a jet aircraft such as for maneuvering of fighter aircraft. The cambering apparatus comprises an upper surface flexible skin panel which is supported along its inner edge by a wing spar assembly and along its outermost edge, by an airfoil edge forming structure. A hinged rib member, through a kinematic linkage mechanism associated between itself and the structure at the outermost edge of the airfoil section, bends and torsionally twists the airfoil edge forming structure about a relative spanwise axis. The kinematic linkage mechanism is slaved to rotating means of the rib member, for torsionally twisting the outermost edge of the airfoil section, upper surface portion, the precise amount of rotation so as to flexuously bend the upper surface and thereby contour it to conform to an aerodynamically predetermined curvilinear plot that will produce the desired camber and the change in the lift characteristics of the airfoil surface.

25 Claims, 11 Drawing Figures

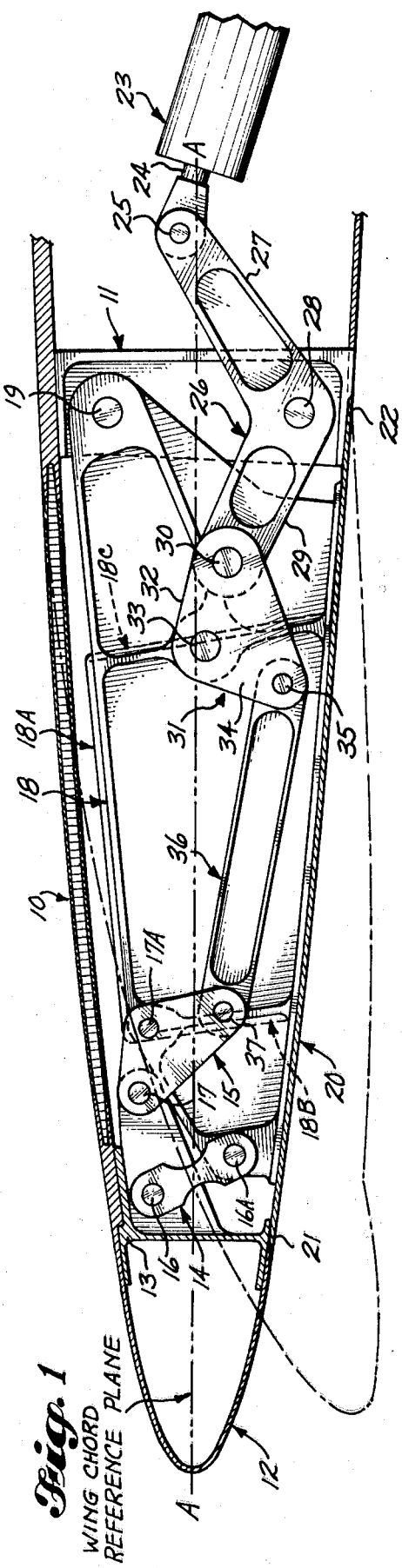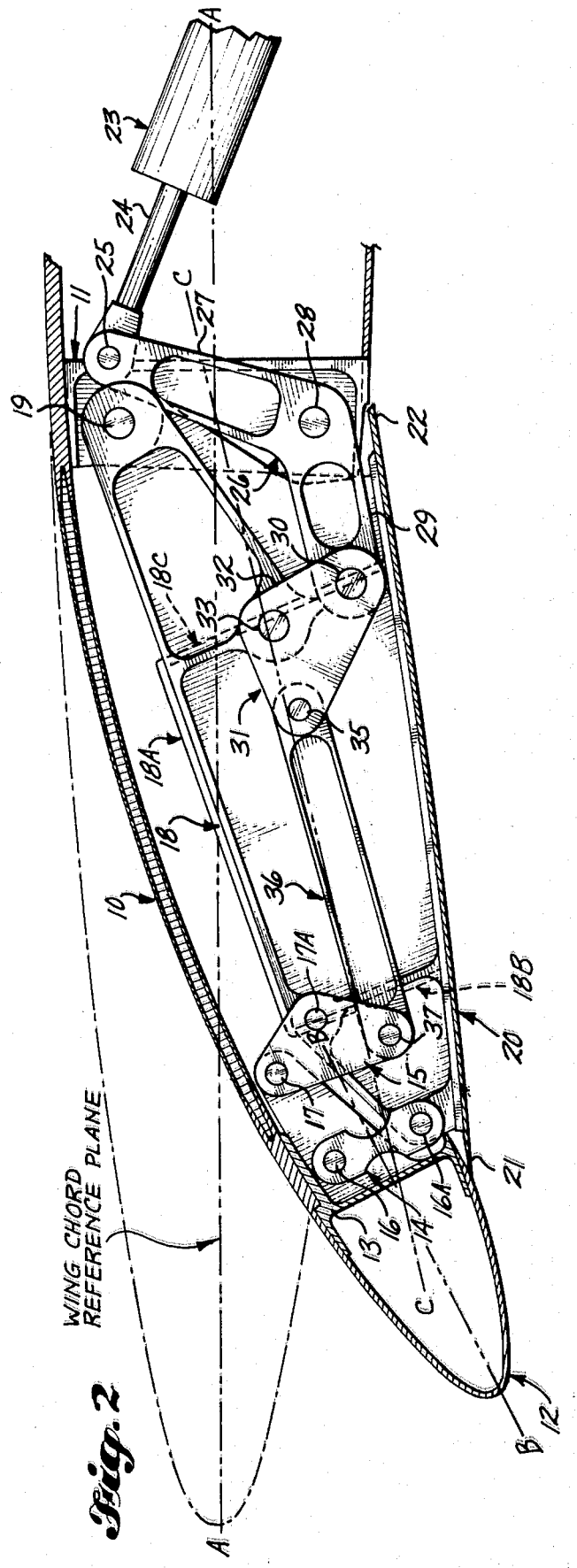

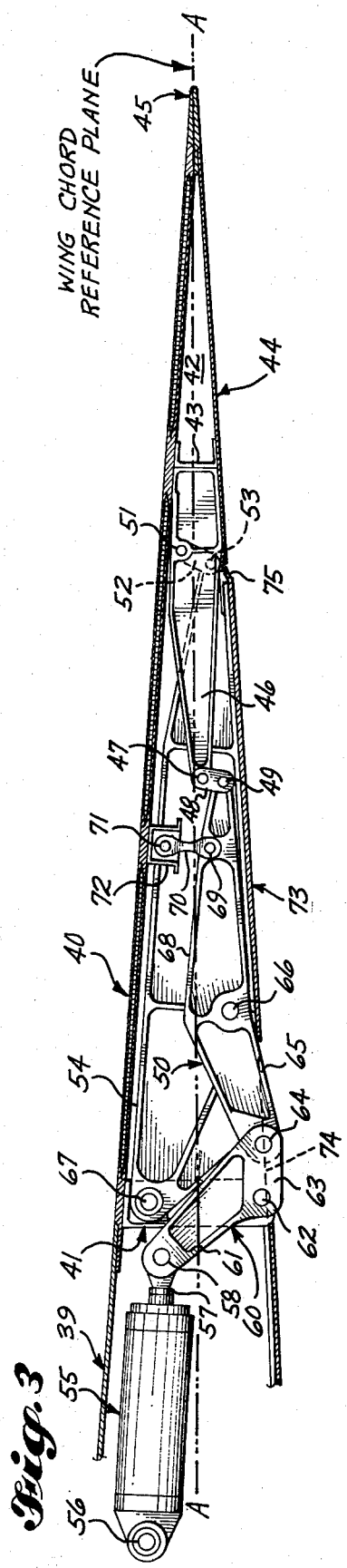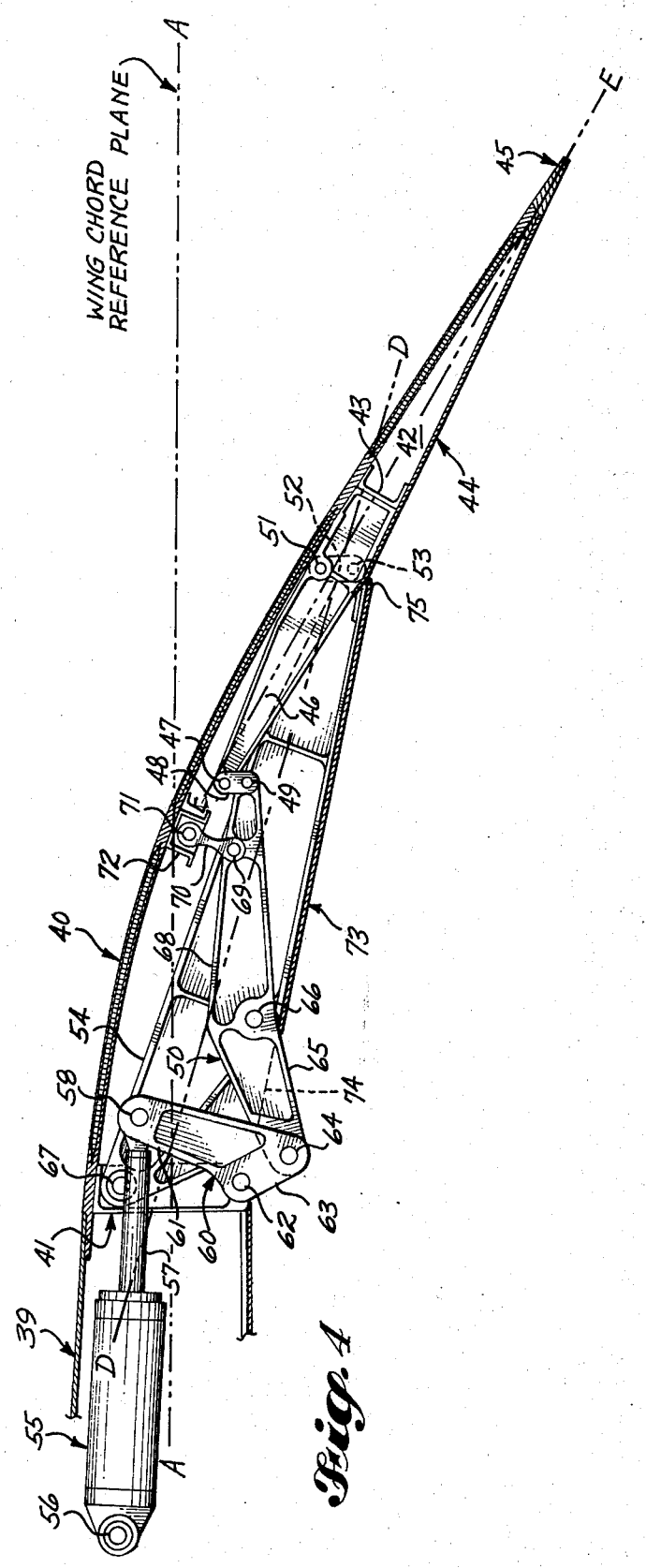

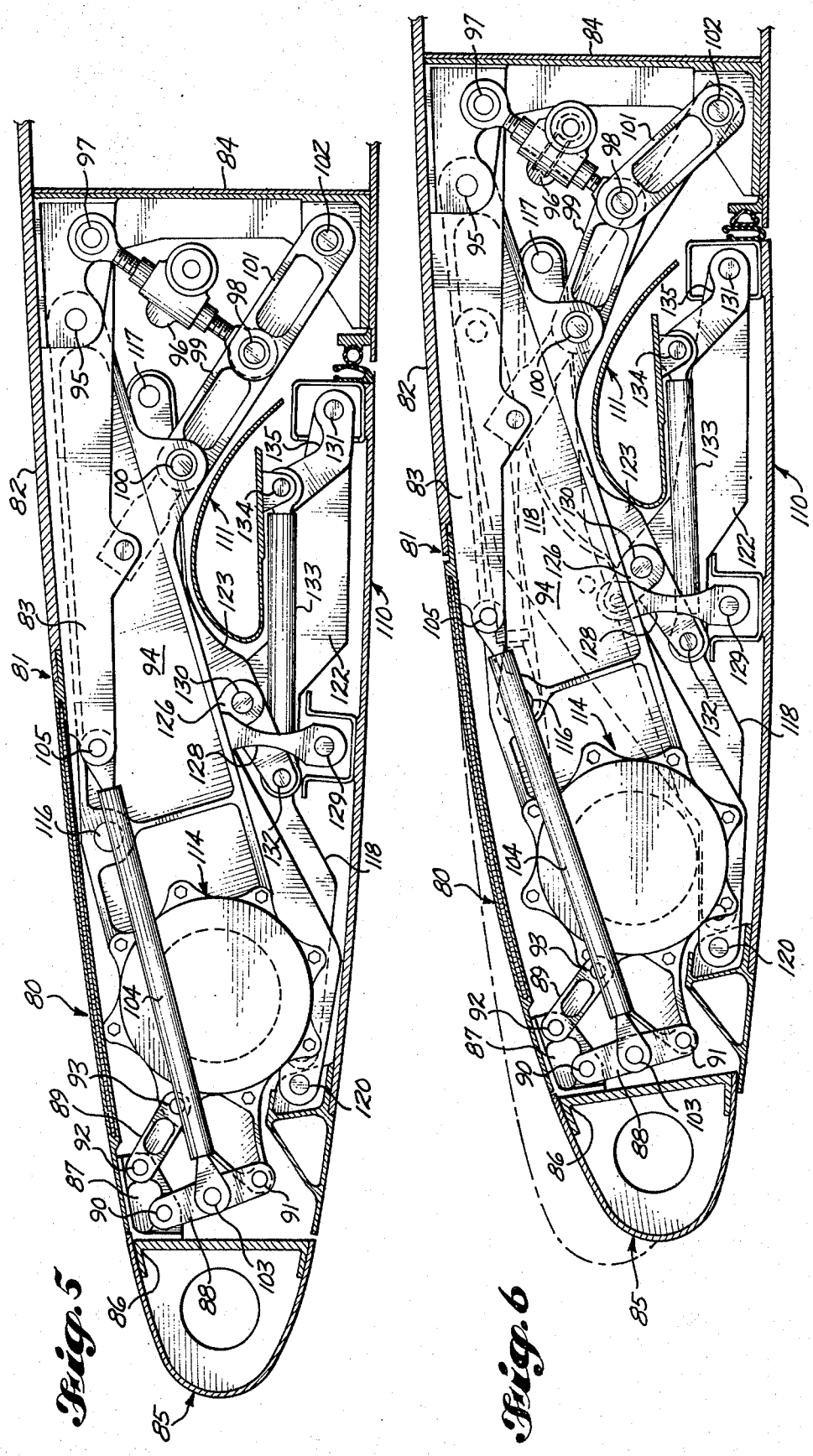

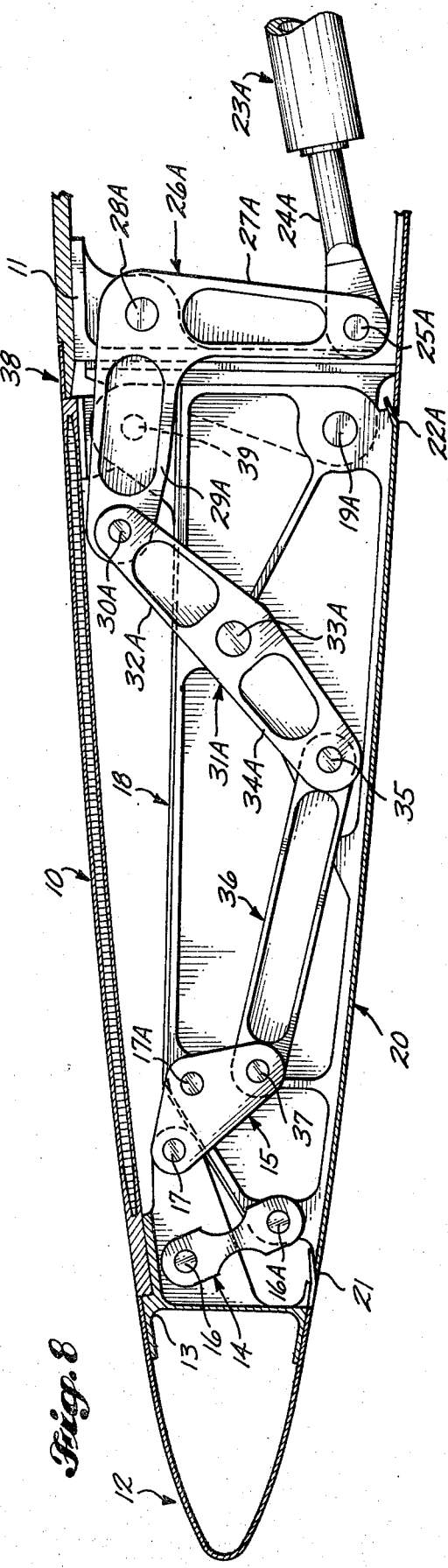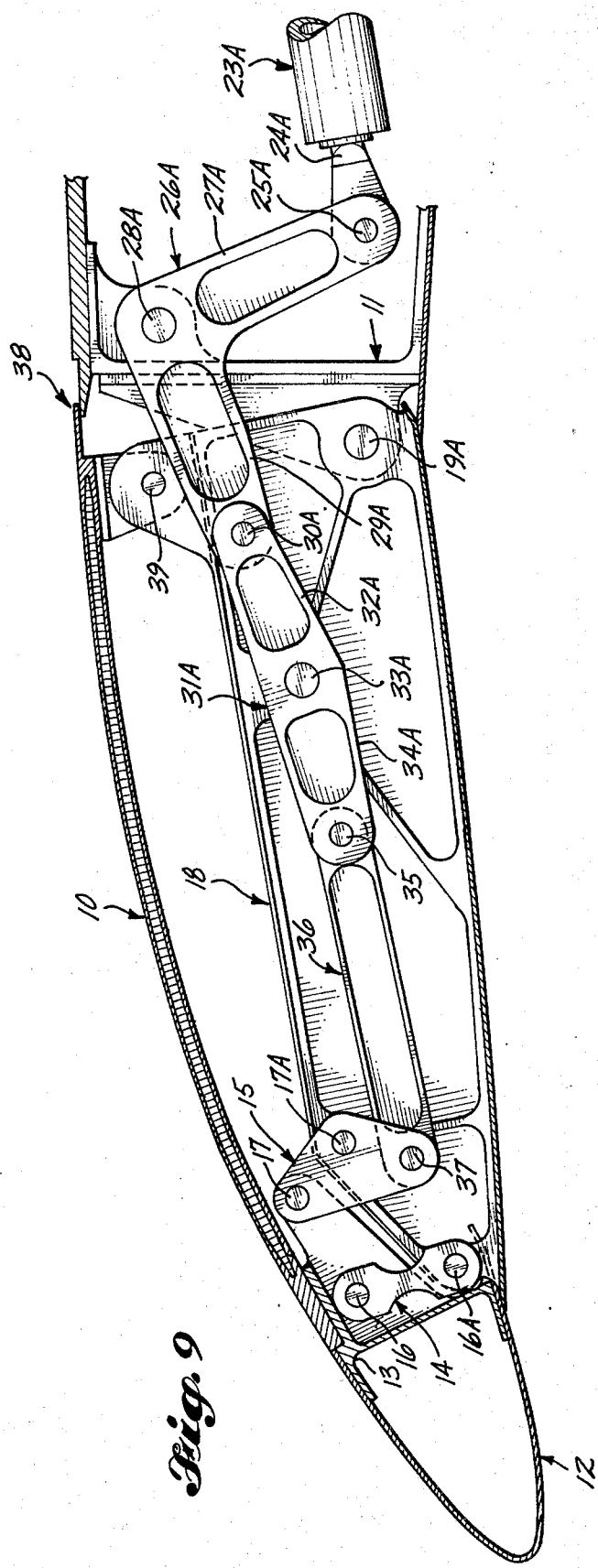

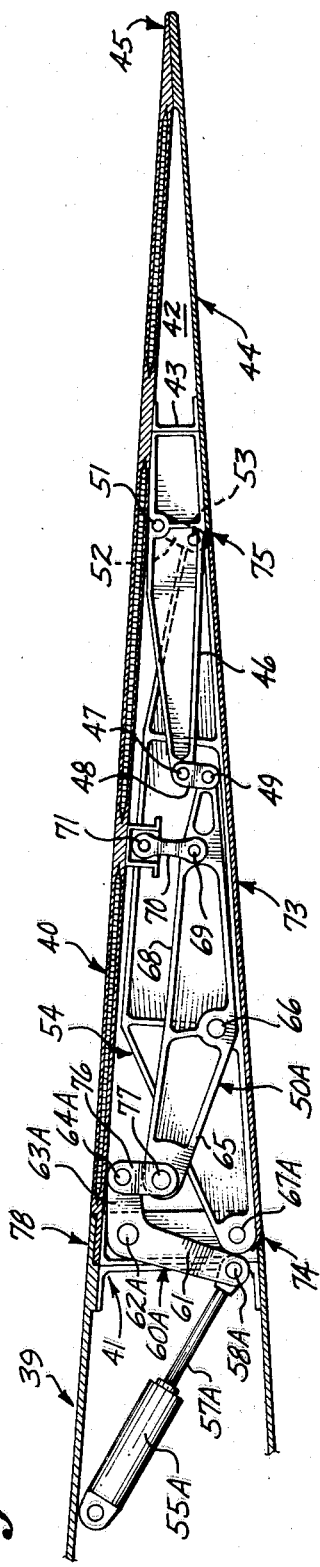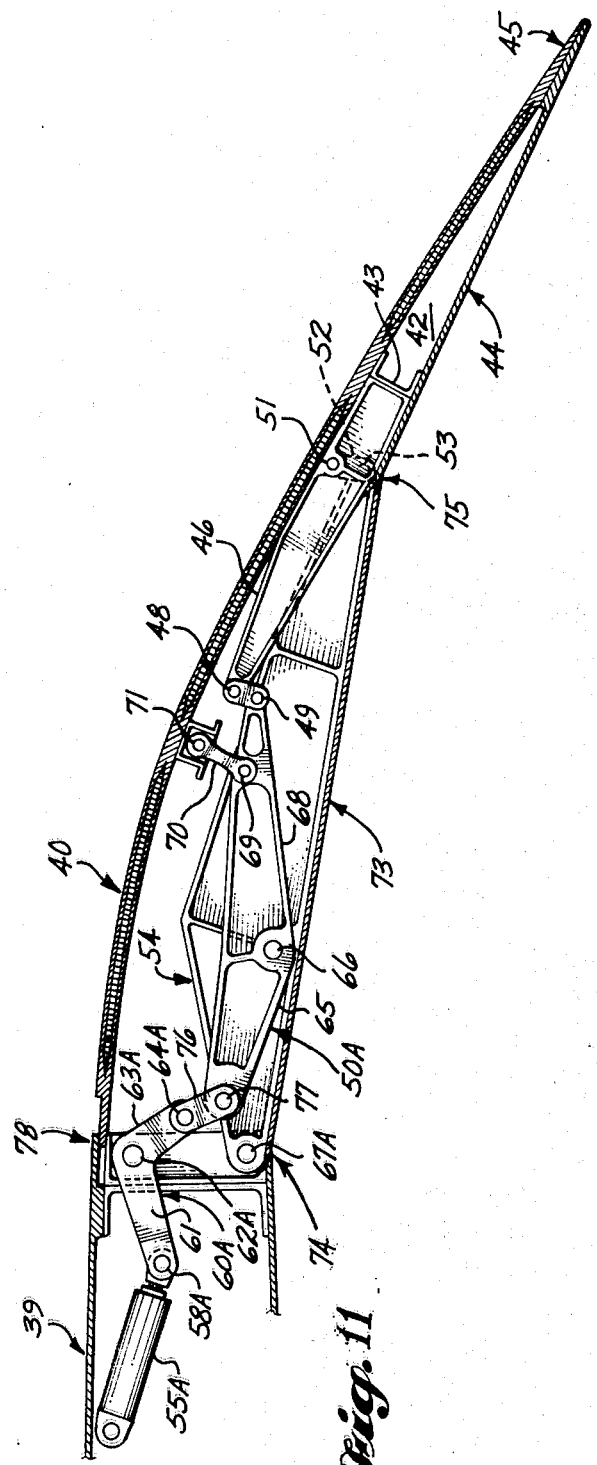

VARIABLE CAMBER AIRFOIL

The invention herein described was made in the course of Contract No. N00014-72-C-0208 with the Office of Naval Research, Department of the Navy.

BACKGROUND OF THE INVENTION

1. Field of the Invention

The present invention is directed to variable camber airfoils wherein the upper surface of the airfoil remains continuously smooth aerodynamically with no abrupt changes in curvature during the airfoil contour change in order to eliminate the high speed drag associated with simple hinged devices that produce an abrupt change in contour and require a space or gap in the contour of the upper skin surface. Although it may be desirable that the upper skin of the airfoil remain unbroken, an overlapping or sliding skin surface could be employed for certain embodiments hereinafter described. Through surface flexing applied to both the leading and trailing edges, the airfoil contour is varied to obtain optimum aerodynamic cruise performance and maneuverability of high performance aircraft such as military fighters and interceptors.

2. Description of the Prior Art

There have been many devices for changing the camber of an airfoil to improve the low speed handling characteristics of an aircraft; however, most of these devices would not be operated at the high speed end of the aircraft performance spectrum.

Leading edge flap or slat devices have been employed for changing the camber of an airfoil, but these devices are primarily employed during low speed flight, such as take-off and landing. Because of the high airloads and structural forces imposed, they are not practical at high speed flight. If they were structurally capable of use at high speeds they would have the disadvantage of producing an excessive amount of drag. Further, the airfoil contours that would be produced by a conventional leading edge flap or slat system would be dependent upon the fixed wing leading edge shape, and therefore, the resulting airfoil contour would be less than ideal. Also, these conventional devices generally produce a break in the continuity of the airfoil contour or the airfoil envelope which produces excessive drag at high speeds. Hinged leading and trailing edges have also been employed, as shown in U.S. Pat. no. 2,650,047, issued Aug. 25, 1953 to Charhart et. al.; and U.S. Pat. No. 2,749,060, issued June 5, 1956 to Brady et. al.; to provide a variation in the envelope contour of an airfoil. However, the external contour of the airfoil is generally not smooth nor streamlined and a sharp break in the contour continuity is generally produced at the hinge line. If the upper flexible skin panel is pulled down without a programmed torsional twist, most of the curvature will take place at one location; e.g., when a rod is bent by gripping one end in a vice and applying a bending force on the other end, all of the curvature takes place right at the vice and the rest of the rod remains relatively straight. This produces a poor aerodynamic surface much like a hinged rigid panel. In a sense, it produces two surfaces at an angle to one anoher instead of a smoothly contoured surface, which makes a difference in aerodynamic performance. This results in high drag losses that are not desirable at cruise flight speeds of present day jet aircraft. It is necessary to program the leading or trailing edge structure, in order to cause the upper flexible wing skin panel to deflect in the desired manner so as to produce the predetermined curvature that will meet the aerodynamically desired contour or camber of an airfoil section.

Crank or bent horn type actuating devices have also been employed to produce the camber variation in an airfoil; however, their lack of stiffness and strength are a problem with this design due to the complex angular, rotational, transverse and telescoping motion, that is required in each of the crank joints. These joints are necessarily large but the supporting crank or bent horn is generally small in cross-section and therefore not capable of carrying the high bending loads that would be imposed during cruise flight speeds of jet aircraft, as is contemplated with the present invention.

In general, most airfoil cambering devices are limited in their capability to provide a predetermined aerodynamic shape. Further, very few prior art devices have practical mechanical designs which lend themselves to functional hardware. With the apparatus of this invention, a mechanical approach to the variable camber airfoil scheme has been disclosed which will satisfy both the aerodynamic and the practical mechanical construction requirements.

SUMMARY OF THE INVENTION

This invention provides a mechanism for varying the camber of an airfoil in order to improve the performance and maneuverability of an aircraft.

Typical aircraft design requirements generally call for the aircraft to meet certain mission requirements. These requirements usually impose limitations in other regions of the flight envelope. These limitations can be largely overcome by varying the wing camber shape in flight. Dramatic performance improvements can be gained through the use of an automatically controlled variable camber wing. Wind tunnel testing conducted on the variable camber wing design has shown improved aircraft performance throughout the flight envelope and particularly in the transonic region where the greatest improvement has been obtained. For high speed aircraft control and maneuvering, the aerodynamic force generated by deflecting a variable camber control surface is from two to three time the aerodynamic force produced by an equivalent deflection of a simple hinged control surface (e.g., an aileron, rudder or elevator).

One of the objects of this invention is to solve the problem of changing an airfoil contour to obtain the optimum aerodynamic performance from an airplane for various combinations of airspeed, altitude and angle-of-attack, by providing the means to vary the contours of either or both the leading and trailing edge of an airfoil.

Another object of the invention is to provide a mechanism to vary the contour of an airfoil leading edge, which mechanism is compatible with and allows the installation of a high lift device, such as a retractable variable camber leading edge flap system within the airfoil leading edge envelope.

Another object is to show how the variable camber linkabe mechanism of the invention is adapted to allow the critical upper skin surface of the airfoil to remain unbroken, thereby eliminating the high speed drag and skin erosion problems associated with devices that require a break in the upper skin surface.

A further object of the invention, in addition to maintaining the upper skin panel continuous, is to remove the actuator from the main load path, thereby reducing the large actuator loads encountered with a simple hinged aerodynamic surface such as an aileron. This results in helping solve power, rigidity and weight problems.

A further object of the invention, is to provide a further embodiment; wherein, slip joint means are disposed along an inner edge of the flexible upper skin surface of an airfoil section, in a spanwise direction, so as to permit an uninterrupted chordwise extension in the upper surface of the airfoil. In this manner, the chordwise foreshortening effect in the net effective planform area, that would normally take place in a cambering airfoil having a continuous intergral upper skin that is merely bent or contoured for varying the camber of the airfoil section, is reduced. Although this may appear to be a slight modification, it has a significant effect in the overall high cruise speed lifting characteristics of an airplane.

One of the advantages of the variable camber airfoil design of the present invention is that it has shown performance improvements in the terms of a higher buffet margin. At 0.8 Mach number, the variable camber airfoil provides almost twice the $C_L$ capability of a conventional fixed camber wing.

Another advantage of the present invention is decreased drag, which in the case of military aircraft, will greatly improve the combat maneuver capability through increase in wing efficiency of 25 percent or more. Also, the loiter capability will be improved since the wing will be operating at a higher aerodynamic efficiency.

Another advantage is in the improved lateral directional stability characteristics of the aircraft. The spin resistance parameter, $C_{nb}$ dynamic, which includes both directional and lateral stability terms, is stable up to at least an angle of attack of 50°; which was the highest value tested in the wind tunnel. Substantiation that these benefits derived from wind tunnel tests can be achieved under actual flight conditions, has been demonstrated in flight tests conducted on aircraft which had fixed camber position wing modifications.

Another advantage of the variable camber airfoil is in the reduction of profile drag, especially in a military subsonic, attack aircraft with a releaseable heavy armament load. The variable camber airfoil will allow the reduction of the profile drag at the high $C_L$ of a fully loaded configuration; and then after release of the armament load, the camber can be decreased on the return flight, to reduce the profile drag at the lighter load condition and lower $C_L$.

Another advantage of the variable camber wing in military aircraft, is that it permits the reduction in the angle of attack of the fuselage during high "G" maneuvers or when pulling high $C_L$'s and with synergetic advantages in over-the-nose vision and weapons release. In addition, the vertical tail height and the size required for directional stability during these maneuvers is substantially reduced.

Another advantage of the variable camber airfoil in military aircraft, is that the wing can be better optimized for supersonic flight and supersonic dash capability, without as much compromising of the subsonic and transonic flight characteristics.

BRIEF DESCRIPTION OF THE DRAWINGS

FIG. 1 is a chordwise cross-sectional view of the mechanism for cambering the leading edge of an airfoil with the linkage arranged at the minimum cambered or non-deflected angular position;

FIG. 2 is a view similar to FIG. 1, with the actuation mechanism for cambering the airfoil positioned at its maximum cambering position;

FIG. 3 is a second embodiment of the invention, wherein the cambering mechanism is applied to the trailing edge of the airfoil and the linkage is arranged at the minimum cambered or non-deflected position;

FIG. 4 is a view similar to FIG. 3, with the cambering linkage at its fully cambered position;

FIG. 5 is a third embodiment of the invention, showing in a chordwise cross-sectional view, the mechanism for cambering the leading edge of an airfoil arranged at the minimum camber position, in combination with a leading edge flap system shown in the retracted position;

FIG. 6 is a view similar to FIG. 5, with the actuation mechanism for cambering the leading edge of the airfoil positioned at an increased camber position;

FIG. 8 is a fourth embodiment of the invention, showing in a chordwise cross-sectional view, the mechanism for cambering the leading edge portion of an airfoil with the linkage arranged at the minimum camber position;

FIG. 9 is a view similar to FIG. 8, with the actuation mechanism for cambering the leading edge portion of the airfoil positioned at an increased camber position;

FIG. 10 is a fifth embodiment of the invention, showing in a chordwise cross-sectional view, the mechanism for cambering the trailing edge of an airfoil and with the linkage mechanism arranged at the minimum camber or non-deflected position;

FIG. 11 is a view similar to FIG. 10, with the cambering linkage at its fully cambered position.

DESCRIPTION OF THE PREFERRED EMBODIMENTS

Figure 7:
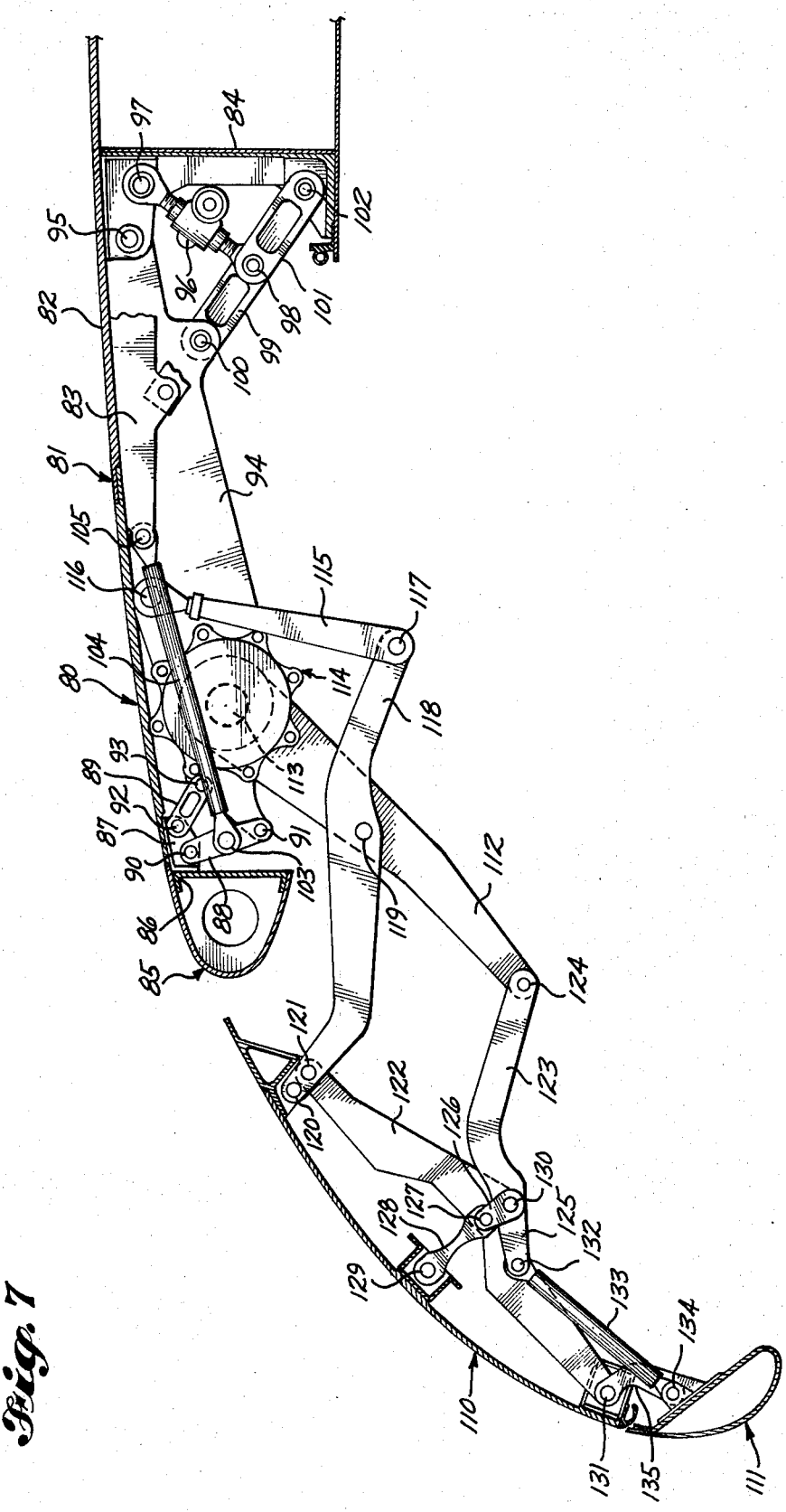
FIG. 7 is a view similar to FIG. 5, with the leading edge flap system shown in the fully extended position for the takeoff or landing mode of flight operation.

FIGS. 1 and 2 are chordwise cross-sectional views of the preferred embodiment of the variable camber leading edge airfoil of the present invention and its variable cambering linkage mechanism arranged at different stages of operation. The upper surface of the airfoil comprises a flexible skin panel 10 which is flexed in a predetermined and controlled manner through a series of spanwise sets of linkage mechanism which are arranged and actuated in a chordwise plane. The flexible skin panel 10 is attached fixedly along its aft spanwise edge, to a relatively fixed structural member 11, such as the front wing spar. The flexible upper skin panel 10 can be constructed so as to be free to translate on a slip joint in and out, as shown in FIGS. 8 and 9, or the linkage mechanism can be kinematically developed as shown in FIGS. 1 and 2, to make it compatible with a non-extensible or absolutely fixed panel. The forward spanwise edge of the flexible panel 10 is connected to a relatively rigid leading edge nose structure 12 having a spanwise nose beam 13. The leading edge of the upper flexible skin panel 10 and its attached nose structure 12 are supported through link 14 and bellcrank 15, and pivotal connections 16, 16A, 17, and 17A by a chordwise rib beam 18. The aft end of the chordwise rib beam 18, is pivotally connected at 19 through a hinge fitting, to the relatively fixed structure 11, or front wing spar.

A lower skin panel 20 is attached along its inner surface to the rib beam 18. The lower skin panel 20 has a forward lip 21 and an aft lip 22. The forward lip 21 extends under the leading edge nose structure and the aft lip 22 extends under the lower, relatively rigid fixed wing skin, at the front spar 11. Both the fore and aft lips, 21 and 22, form a sliding connection with adjacent structure, to accommodate the lower skin surface contraction when the leading edge camber of the airfoil is increased by the downward deflection of the nose structure 12. The rib beam 18 could be constructed in a spanwise direction as a structural box section, comprising: the lower skin panel 20; an upper rib beam skin panel 18A; and two side or end closure skin panels 18B forward, and 18C aft; thereby, forming a hinged skin-rib, box-member.

The actuation system for cambering the forward portion of the airfoil comprises a linear actuator 23 having its housing pivotally attached to fixed wing structure (not shown) and its actuator rod 24 pivotally connected at 25 to the upper aft arm 27 of a driving bellcrank 26. The driving bellcrank 26 is rotatably mounted at 28 to a hinge fitting in the lower portion of the front wing spar 11 and the other forward arm 29 of the driving bellcrank 26, is pivotally connected at 30 to the aft arm 32 of an idler bellcrank 31. The idler bellcrank 31 is rotably mounted at 33 to the rib beam 18 and the other forward arm 34 of the idler bellcrank 31 is pivotally connected at 35 to the aft end of link 36. The forward end of link 36 is connected at 37 to the driven nose bellcrank 15 which is rotatably mounted at 17A to the rib beam 18.

In the operation of increasing the leading edge camber of the airfoil, from the minimum camber position shown in FIG. 1 through to the fully or maximum cambered position shown in FIG. 2, the linear actuator 23 extends and thereby rotates the driving bellcrank 26 counter-clockwise about its structural attachment pivot 28. This, through the common pivotal connection 30, rotates the idler bellcrank 31 clockwise about its pivotal attachment point 33 on the nose rib beam 18. This rotational movement between bellcranks 26 and 31 causes their arms 29 and 32 respectively, to move out of alignment with respect to each other, which arms function as an extensible link between pivotal connections 33 and 28 to vary the distance there between and causes the nose rib beam 18 to rotate counter-clockwise about its pivot 19. The downward rotational movement of the rib beam 18 pulls down on the nose structure 12 through a kinematic linkage mechanism comprising: a connecting link 14 and bellcrank 15, and thereby imparts a downward bending force to the upper flexible panel 10. Basically, this kinematic linkage mechanism has two mechanical linkages, link 14 and bellcrank 15, which are spaced apart chordwise and interconnect the nose structure 12 with the rib beam member 18. The linkage of the kinematic mechanismm comprises: structure of the upper flexible skin 10 which is between the chordwise spaced linkages 14 and 15, as forming one link; structure of the rib beam member 18 which is between the chordwise spaced linkages 14 and 15, as forming another links; and the two mechanical linkages 14 and 15, as forming the remainder of the kinematic linkage mechanism. This downward movement of the rib beam 18 not only pulls down on the nose structure 12 through link 14 and bellcrank 15, but also causes the nose 12 and its spanwise nose beam 13 to be given a torsional twist about relative spanwise axis. The attachment of the nose structure 12 through the kinematic linkage mechanism, and its motion is stabilized and programmed through a slaving linkage comprising: the interconnecting link 36 which attaches to the idler bellcrank 31 and the connection of idler bellcrank 31 to the driving bellcrank 26 for rotating the rib beam member 18. The kinematics of the nose torsional linkage is such that it rotates the nose structure 12 the exact amount necessary as the rib beam is rotated downward, so as to flexuously bend the upper surface and give the proper degree of curvature to the upper flexible skin panel 10 for producing the desired aerodynamic cambering of the airfoil. More particularly, the airfoil has a chord reference plane indicated by the dash-dot-dot line A—A. The leading edge nose structure 12 and the chordwise rib beam member 18, each have chordwise reference lines, B—B, C—C respectively; which lines are coincident with the airfoil chord reference plane A—A, when the apparatus for varying the camber of the airfoil is at its non-cambering position, as shown in FIG. 1.

When the actuating mechanism rotates the chordwise rib beam member 18 down, then slaved off from this motion is a four-bar linkage mechanism which torsionally rotates the nose structure about a spanwise axis. The four-bar linkage comprises: the nose structure between pivotal connections 16 and 17 as one bar; the chordwise rib structure between pivotal connections 16A and 17A forms the other bar; and the two links 14 and 15 form the remaining bars. One of the links, namely 15, has an arm extending therefrom formed between pivotal connections 17A and 37, which crank-arm receives the slaving motion from interconnecting link 36 that is attached to idler bellcrank 31; which is in turn rotably driven by bellcrank 26. Through this four-bar linkage arrangement, a firm grip is imposed on the nose structure 12 through which it is possible to program exactly the amount of flexure desired to produce the exact curvature that has been aerodynamically calculated. When the leading edge nose structure 12 and the rib beam member 18, are rotated to vary the camber of the airfoil, as shown in FIG. 2, the leading edge nose structure 12 is rotated at a greater angular rate and through a greater angle of deflection, with respect to the basic airfoil reference chord plane A—A, than that of the chordwise rib beam member 18. This is illustrated in FIG. 2 by the relationships of the segments B—B and C—C to the basic airfoil chord reference plane A—A; and this greater angular deflection of the leading edge nose structure 12, imparts a torsional twist to the leading edge portion of the flexible upper skin panel 12, so as to controllably bend the upper surface about relative spanwise axies for cambering the airfoil. Without torsionally controlling the leading edge nose structure 12, the cambering of the nose of the airfoil or the deflection of the flexible upper skin panel 10, would function similar to the panel being suspended in a cantilever fashion; i.e., most of the curvature would take place adjacent to its attachment to fixed wing structure such as adjacent to the front wing spar 11. Whereas, with the introduction of another member and torsionally twisting the leading edge nose structure 12, it becomes possible to get the degree of curvature desired. The combination of mechanisms shown in the present invention allows for the solution of positioning the upper surface of the flexible panel 10 along the aerodynamically determined location of points outlining the curvature of the upper airfoil surface. For a little more hump in the flexible skin panel 10 to match a degree of curvature, the length of the depending arm formed between pivotal connections 17A and 37 could be made a little shorter so that the nose structure 12 would rotate around a little faster, relative to the rotation of the rib beam 18, as it rotated in order to produce an increase in curvature. That is to say, in summary, that the rate of rotation of the leading edge nose structure 12 with respect to the pivoting of the rib member 18, determines the curvature of the flexible panel 10.

Should it be deemed important enough or desirable to eliminate the chordwise foreshortening effect or the reduction in the net effective planform wing area, as the nose (in the case of leading edge cambering) is moved downward through a relatively large angular deflection, the linkage mechanism could be modified as shown in FIGS. 8 and 9, to satisfy a constant net wing area requirement by breaking the upper flexible wing panel adjacent to the structural pivotal connection of the hinged rib beam supporting it, so as to allow the nose and flexible panel to come forward on a slip joint.

FIGS. 3 and 4 show a second embodiment of the invention associated with the trailing edge portion of an airfoil. The cambering mechanism is somewhat similar to that described for the leading edge device shown in FIGS. 1 and 2; however, there are some different in the type of linkage and their arrangement, which results in a slightly different kinematic operation. In the chordwise cross-sectional views of FIGS. 3 and 4, the cambering mechanism for the rearward portion of the airfoil is shown in two positions of operation, i.e., in the uncambered position, and the fully cambered position respectively. The upper surface of this rearward portion of the airfoil comprises a flexible skin panel 40 that is supported spanwise along its forward edge through a fixed joint by a relatively fixed structural member such as the wing rear spar 41. Also, should it be deemed desirable to reduce the chordwise foreshortening effect due to cambering, the upper flexible skin panel 40 could be broken adjacent to the structural pivotal connection 67 of the rib beam member 54, and a slip joint incorporated as shown in FIGS. 8 and 9 so that the trailing edge structure and the upper flexible panel could be made to extend aft as the aft portion of the airfoil section is cambered; thereby, substantially retaining the planform wing area constant. The trailing edge section of the flexible upper panel 40 is assembled into a relatively rigid wing trailing edge box structure 42 comprising: a spanwise beam 43 that rigidly interconnects the flexible upper skin panel 40 with a lower skin panel 44; and the trailing edge terminus 45 formed by the fastening together of the merging upper and lower trailing edge skin surfaces 40 and 44 respectively. The wing trailing edge box structure 42 has a forward projecting arm member 46 through which it is supported and torsionally twisted about a spanwise axis for imparting a predetermined aerodynamic contour to the upper flexible panel 40. The forward projecting arm member 46 has two pivoted connections: the extreme forward end of the arm is pivotally connected at 47 to the link 48 which in turn connects at 49 to the idler bellcrank 50; and aft of the forward arm connection 47 is a pivoted connection 51 to the upper end of link 52 wich in turn is connected at its lower end 53 to the aft terminus of the rib beam 54.

The support and actuation system for cambering the aft portion of the airfoil comprises a linear actuator 55 having its housing pivotally attached at 56 to fixed wing structure and its actuator rod 57 pivotally connected at 58 to the upper arm 61 of a driving bellcrank 60. The driving bellcrank 60 is rotatably mounted at 62 to a hinge fitting at the lower portion of the wing rear spar 41 and the other aft arm 63 of this bellcrank is pivotally connected at 64 to the forward arm 65 of an idler bellcrank 50. The idler bellcrank 50 is rotatably mounted at 66 to the rib beam 54. This rib beam 54 is rotatably mounted to relatively fixed wing structure at 67, through a hinge fitting, to the upper portion of the wing rear spar 41 and is supported from the lower portion of this spar by bellcrank arms 63 and 65. The idler bellcrank 50 has an aft arm 68 which has two pivotal linkage connections: the extreme aft end of the arm 68 is pivotally connected at 49 to a link 48 which in turn is connected at 47 to the forward projecting arm member 46 which is integral with the wing trailing edge box structure 42; and slightly forward or inward of the aft end connection 49, is a pivotal connection 69 to a link 70 which in turn is connected at 71 to a spanwise stringer 72 that is fastened to the upper flexible skin panel 40. In FIGS. 3 and 4, the kinematic linkage mechanism which functions in a manner somewhat similar to the four-bar linkage arrangement shown in FIGS. 1 and 2, comprises: the structure on the forward projecting arm member 46 of the wing trailing edge box structure 42 between the chordwise spaced connections 47 and 51 as forming one link or bar; the structure on the chordwise rib beam member 54, beyween the chordwise spaced connections 66 and 53, as forming the second link or bar; and the chordwise spaced linkage interconnections between the upper surface and the rib member forming the remainder of the kinematic linkage mechanism, wherein the link 52 forms the third link or bar and the series connected linkage elements 48 and arm 68 form a somewhat variable length link connection that would constitute the fourth link or bar in the arrangement shown in FIGS. 1 and 2. This kinematic linkage mechanism is slaved to the rib member actuating means for torsionally twisting the trailing edge portion of the upper surface, so as to flexously bend the upper surface and thereby vary the camber of the airfoil. More particularly, the airfoil has a chord reference plane indicated by the dask-dot-dot line A—A. The trailing edge box structure 42 and the chordwise rib beam member 54, each have chordwise reference lines, D—D, E—E respectively; which lines are coincident with the airfoil chord reference plane A—A, when the apparatus for varying the camber of the airfoil is at its non-cambering position, as shown in FIG. 3. When the trailing edge box structure 42 and the rib beam member 54, are rotated to vary the camber of the airfoil, as shown in FIG. 4, the trailing edge box structure 42 is rotated at a greater angular rate and through a greater angle of deflection, with respect to the basic airfoil reference chord plane A—A, than that of the chordwise rib beam member 54. This is illustrated in FIG. 4 by the relationships of the segments D—D and E—E to the basic airfoil chord reference plane A—A; and this greater angular deflection of the trailing edge box structure 42, imparts a torsional twist to the trailing edge portion of the flexible upper skin panel 40, so as to controllably bend the upper surface about relative spanwise axes for cambering the airfoil.

An intermediate lower skin panel 73 is attached chordwise to the lower surface of the rib beam 50 and has a projecting lip portion along its forward edge 74 and its aft edge 75; which lip portions extend under the lower relatively rigid fixed wing skin at the rear spar 41 and the trailing edge box structure 42 respectively, and forms a flexible slip joint contact therewith to accommodate the contraction of the lower skin surface when the airfoil is cambered.

In the operation of cambering the aft portion of the airfoil from the minimum camber position shown in FIG. 3 through to the fully or maximum cambered position shown in FIG. 4, the linear actuator 55 extends and thereby rotates the driving bellcrank 60 clockwise about its structural attachment pivot 62. This, through the common pivotal connection 64, rotates the idler bellcrank 50 counterclockwise about its pivotal attachment point 66 on the cantilevered rib beam 54. This rotational movement between bellcranks 60 and 50, causes their arms 63 and 65, respectively, to move out of alignment with respect to each other, which arms function as an extensible link between pivotal connections 62 and 66, to vary the distance therebetween and causes the trailing edge rib beam 54 to rotate clockwise about its structural connection 67. This downward rotational movement of the rib beam 54 pulls down on the wing trailing edge box structure 42 through link 52 and also causes the wing trailing edge box structure 42 with its spanwise beam 43, to be given a torsional twist about a spanwise axis through linkage slaved from the actuating means of rib beam 54. The attachment of the trailing edge box structure 42 is primarily stabilized and its motion programmed through a slaved kinematic linkage such that the trailing edge box structure 42 is rotated the exact amount necessary, as the rib beam 54 rotates downwardly, to give the proper degree of curvature to the upper flexible skin panel 40 for producing the desired aerodynamic cambering to the airfoil.

In the design of both the leading and trailing edge cambering apparatus, the terminus of either end portion of the airfoil section such as the nose and trailing edge, is constructed as a separate structural member or box. This structural box has a main support member such as a rotatably actuated chordwise rib for deflecting the flexible upper skin panel and the attached leading or trailing edge structural box, like a simple hinged aileron or flap device; and off of this motion a kinematic linkage mechanism is slaved; or in the case of the trailing edge as shown in FIGS. 1 and 2, a four-bar linkage arrangement. As shown in FIGS. 3 and 4, the interconnecting linkages between the trailing edge box structure 42 and the rib beam member 54, are spread a little further apart than that of the nose cambering apparatus, shown in FIGS. 1 and 2. This is to provide a greater moment arm; because, the trailing edge box structure 42 has a relatively larger surface area than the nose structure 12. Since the area of the flexural surface 40 is large, a spanwise stringer 72 and link 70 are required. Should the surface area of the leading edge flexible panel shown in FIGS. 1 and 2 become large, a stringer and link would likewise be added. Further, in the case of a tapered planform wing, at certain spanwise locations, as you proceed inboard from the wing tip, the chordwise length of the flexible panel could also increase to such length (i.e., the leading and trailing edge box structure could extend chordwise out from the wing spars such a distance), that it would be advisable to add additional links for support of the intermediate portion of the panel.

FIGS. 5 to 7 show a third embodiment of the invention associated with a take-off and landing, leading edge flap system as is more clearly disclosed in U.S. Pat. No. 3,504,870 issued Apr. 7, 1970. This combination of an airfoil cambering mechanism that will provide precisely cambered airfoil contours through exact kinematic positioning of the nose assembly and the flexible upper surface skin panel; and a retractable variable camber leading edge flap which is stowable within the airfoil envelope of a high speed jet aircraft may be desirable in order to achieve the maximum performance gain potential of the variable camber concept. Most of the known devices are capable of providing only one of the functions, i.e., either a wing cambering means or a retractable leading edge flap, and do not lend themselves to a combination.

Although the cambering mechanism is somewhat similar to that described with respect to the preferred embodiment shown in FIGS. 1 and 2, there are some differences in the type of linkage and their arrangement which results in a slightly different kinematic result, and therefore the elements have been identified with different numerals. In the chordwise cross-sectional views of FIGS. 5 to 7, the leading edge airfoil cambering mechanism is shown in two positions of operation, i.e., in the uncambered position and in the fully cambered position; and in addition, the variable camber leading edge flap system is also shown in two positions of operation, i.e., in the retracted position and in one of the forward extended positions for low speed flight. A forward section of the upper surface of the airfoil shown in the figures comprises a flexible skin panel 80 that is supported spanwise along its aft edge through a slip joint 81 to a rigid upper skin panel 82 attached to a support bracket 83 which in turn, is relatively fixed to a structural member such as the wing front spar 84. The forward spanwise edge of the flexible panel 80 is connected to a relatively rigid leading edge nose structure 85 having a spanwise nose beam 86. The wing leading edge nose structure has an aft projecting arm member 87, rigidly fastened to the spanwise nose beam 86. The leading edge of the upper flexible skin panel 80 and its attached nose structure 85, are supported through the aft projecting arm member 87, by a forward nose link 88 and aft nose link 89. The forward nose link 88 and aft nose links 89, through their pivotal connections 90, 91, 92, 93, are pivotally mounted to the chordwise rib beam 94; and a stablizing link 104 is attached at its forward end at 103 to approximately the mid-point of the forward nose link 88, and the aft end of the link 104 is attached at 105 to support bracket 83. The rib beam 94 has its aft end pivotally connected at 95 through a hinge fitting to the wing front spar 84.

The support and actuation system for cambering the airfoil comprises a jack-screw actuator 96 having its upper end pivotally attached at 97 through a hinge fitting to the front wing spar 84, and its lower end pivotally connected at 98 to the interconnection of a scissors linkage. The scissors linkage comprises: an upper link 99 which is pivotally connected at 100 to the cantilevered rib beam 94; and a lower link 101 which has its lower end pivotally connected at 102 through a hinge fitting to the lower portion of the front wing spar 84.

In the operation of cambering the leading edge portions of the airfoil, from the minimum camber position shown in FIG. 5 to the fully or maximum cambered position shown in FIG. 6, with the variable camber flap system remaining in the retracted or stowed position, the screw-jack actuator 96 retracts and thereby rotates scissor links 99, 101 out of alignment to decrease the distance between pivotal connections 100 and 102, and causes the rib beam 94 to rotate counter-clockwise about its structural pivotal connection 95. This downward rotational movement of the rib beam 94, pulls down on the relatively rigid leading edge nose structure 85 through its aft projecting arm member 87 integral therewith, by the links 88 and 89. Through this aft projecting arm member 87 the wing leading edge nose structure 85 is supported and torsionally twisted about a spanwise axis for imparting a predetermined aerodynamic contour to the upper flexible panel 80. The nose structure 85 through its attached aft projecting arm member 87 is stablized and its motion programmed through the kinematic movement of connecting links 88 and 89. Link 88 at an intermediate position is connected at 103 to the forward terminal of a stablizing link 104 which switches about a fixed pivot 105 on support bracket 83 forming part of the relatively fixed wing structure. The stablizing link 104 has a function similar to that of link 36 shown in FIGS. 1 and 2, such that in the process of moving the rib beam 94 down, the kinematic linkage mechanism comprising links 88, 89 and stablizing link 104, produces the required motion for rotating the nose structure 85 the precise amount necessary to give the proper camber to the upper flexible skin panel 80. Or stated in another manner, the kinematics of the nose torsional linkages is such that it rotates the nose structure 85 the exact amount necessary, to give the proper degree of curvature to the upper flexible skin panel 80 for producing the desired aerodynamic cambering to the airfoil, as the rib beam 94 is rotated downward.

FIG. 7 shows the flexible flap panel 110 with its folding bull nose 111 and actuating linkage, in the extended position for takeoff and landing flight operations. The first link of the actuating linkage comprises a support arm 112 having one end 113 fixedly connected to a torque shaft splined to a rotary actuator 114 connected to the rib beam 94. Aft of the support arm connection 113 is a structural pivotal attachment point 116 for the upper end of link 115. The lower end of link 115 is pivotally connected at 117 to a horizontal link 118. The middle portion of horizontal link 118 is pivotally attached at 119 to a middle portion of the support arm 112. The forward portion of horizontal link 118 is pivotally connected at 120 to the aft end of the flexible flap panel 110, and also at pivotal connection 121 to a link 122 which is substantially parallel to support arm 112 in the extended position. Substantially parallel to horizontal link 118 in the extended position, is a link 123 which is pivotally connected at its aft end 124 to the lower end of support arm 112. The forward end of link 123 has two lugs 125 and 126 integral therewith. The lug 126 pivotally connects at 127 to the lower end of a short link 128 which is in turn connected at its upper end 129 to an intermediate portion of the flexible flap panel 110 for precise control of the aerodynamic shape or curvature thereof. Adjacent to and below the lug 126 is a pivotal connection 130 which interconnects the intermediate portion of link 122 with an intermediate portion of link 123. The lower end of link 122 is pivotally connected at 131 to the forward end of the flexible flap panel 110. Connected to the forward end of link 123 at 132 is one end of link 133 which is connected at the other end 134 to the bull nose 111. The bull nose 111 has an arm 135 integral therewith through which it is supported and mounted for rotation at 131 on the lower end of link 122.

FIGS. 8 and 9 are chordwise cross-sectional views of a fourth embodiment of the invention; wherein, the chordwise foreshortening effect or the reduction of the net effective planform wing area due to cambering of the wing, is decreased from that shown in FIGS. 1 and 2. FIG. 8 shows the airfoil in the uncambered position of operation and FIG. 9, the fully cambered position. The cambering mechanism shown in FIGS. 8 and 9, is substantially similar to that shown in FIGS. 1 and 2; except: that the rib beam 18, as seen in FIGS. 1 and 2, has its structural pivotal connection 19 moved nearer to the lower surface of the airfoil, as shown in FIGS. 8 and 9 by the reference numeral 19A; the upper flexible wing panel 10 has a slip joint connection 38 at its inner end so as to allow the leading edge nose structure to come further forward, thereby decreasing the foreshortening effect when moved to the fully cambered position, shown in FIG. 9. As a result of this hinging change to rib beam 18, there is also a slight change necessary in the linkage mechanism from the linear actuator 23 to link 36 interconnecting the four-bar linkage mechanism of the nose structure which will now be described; wherein, elements shown in FIGS. 8 and 9 which are similar in appearance and function to those of FIGS. 1 and 2, have been given like reference characters.

In the operation of increasing the leading edge camber of the airfoil, from the minimum camber position shown in FIG. 8 through to the fully or maximum cambered position shown in FIG. 9, the linear actuator 23A contracts and thereby rotates the driving bellcrank 26A counter-clockwise about its structural attachment pivot 28A. This, through the forward arm 29A, of the driving bellcrank 26A and its common pivotal connection 30A, to the idler bellcrank 31A, rotates the idler bellcrank 31A clockwise about its pivotal attachment point 33A on the nose rib beam 18. This rotational movement between bellcranks 26A and 31A, causes their arms 29A and 32A respectively, to move out of alignment with respect to each other, which arms function as an extensible link between the pivotal connections 33A and 28A, to vary the distance therebetween. This causes the nose rib beam 18 to rotate counter-clockwise about its pivot 19A. This downward rotational movement of the rib beam 18: pulls down on the nose structure 12, through the connecting link 14 and bellcrank 15; and also moves the aft edge of the upper flexible skin panel 10, outward on its slip-joint 38, through pivotal connection 39. In addition to this downward movement, a torsional twisting movement is imparted to the nose structure 12 through the four-bar linkage mechanism, in a manner similar to that previously described with respect to FIGS. 1 and 2, in order that the desired degree of curvature is applied to the upper flexible skin panel 10.

FIGS. 10 and 11 show a fifth embodiment of the invention which substantially reduces the chordwise foreshortening effect or the reduction in the net effective planform area of the airfoil, that would be present in the embodiment shown in FIGS. 3 and 4. In a comparison of the embodiments of FIGS. 3 and 4, with that of FIGS. 10 and 11, it will be noted that in FIGS. 10 and 11, a slip-joint 78 is incorporated between the upper flexible skin panel 40 and the relatively rigid upper skin 39 fixedly attached to rear spar structure 41. With this slip-joint 78 and a modification of the linkage, the trailing edge structure 42 and the flexible panel 40, are permitted to extend aft and thereby substantially maintain the net effective planform area of the airfoil constant. FIG. 10 shows the airfoil in the uncambered position of operation and FIG. 11, the fully cambered position. The cambering mechanism shown in FIGS. 10 and 11, is substantially similar to that shown in FIGS. 3 and 4; except: that the rib beam member 54, as seen in FIGS. 3 and 4, has its structural pivotal connection 67 moved nearer to the lower surface of the airfoil, as shown in FIGS. 10 and 11 by the reference numeral 67A; the upper flexible wing panel 40 has a slip-joint connection 78 at its inner end so as to allow the trailing edge structure to move further aft, and thereby decrease the chordwise foreshortening effect of the airfoil when it is moved to the fully cambered position, shown in FIG. 11. As a result of this hinging change to rib beam member 54, there is also a slight change necessary in the linkage mechanism from the linear actuator 55 to arm 68 which will now be described; wherein, elements that are shown in FIGS. 10 and 11, which are similar in appearance and function to those of FIGS. 3 and 4, have been given like reference characters. In the operation of increasing the trailing edge camber of the airfoil, from the minimum camber position shown in FIG. 10 through to the fully or maximum cambered position shown in FIG. 11, the linear actuator 55A contracts and thereby rotates the driving bellcrank 60A clockwise about its structural attachment pivot 62A. This, through the forward arm 63A, of the driving bellcrank 60A and its common pivotal connection 62A, to the bellcrank 50A, through an interconnecting link 76, rotates the bellcrank 50A counter-clockwise about its pivotal attachment point 66 on the rib beam member 54. The clockwise rotational movement of driving bellcrank 60A causes the downward rotational movement of the rib beam members 54 and through a kinematic linkage mechanism comprising a connecting link 52 and the series linkage connection of link 48 and arm 68, pulls down on the trailing edge structure 42. Basically, this kinematic linkage mechanism has two mechanical linkages which are spaced apart chordwise and interconnect the trailing edge structure 42 with the rib beam member 54. The linkage of the kinematic mechanism, comprises: the structure of the upper flexible skin 40 which is between the chordwise spaced linkages of connecting link 52 and the series linkage connection of link 48 and arm 68, as forming one link; the structure of the rib beam member 54 which is between the chordwise spaced linkages 52 and 48, 68, as forming the remainder of the kinematic linkage mechanism. This downward movement of the rib beam member 54, not only pulls down on the trailing edge structure 42 through said chordwise spaced linkages, and moves the inner-edge of the upper flexible skin panel 40 outward on its slip-joint 78, but also causes the trailing edge structure 42 to be given a torsional twisting moment about relative spanwise axies, by the kinematic linkage mechanism being slaved off of the actuating means imparting rotational movement to the rib beam member 54. Whereby, the desired degree of curvature is applied to the upper flexible skin panel 40.

While the invention has been disclosed with reference to preferred embodiments, it is to be understood that modifications and changes which become obvious to a person skilled in the art as a result of the teachings hereof, will be encompassed by the following claims:

What is claimed is:

1. A variable camber airfoil comprising: an aerodynamically continuous upper surface of the airfoil connected at its inner-end to fixed structure of the airfoil; a rib member fixedly hinged at its inner-end to fixed structure of the airfoil for rotation in a chordwise plane and having its free-end extending outwardly therefrom toward the edge of the airfoil; means connecting the outer-end of said upper surface with the free-end of the rib member such that the rib member supports the upper surface independently of the structural continuity of said upper surface; means for rotating the rib member about its hinged inner-end; means operatively associated with the means that impart rotational movement to the rib member for producing a motion in said means connecting the outer-end of said upper surface with the free-end of the rib member so as to controllably bend the upper surface and in combination, torsionally twisting the outer-end of said upper surface about a relatively span-wise axis to impart a flexuous curvature thereto and thereby vary the camber of the airfoil.

2. A variable camber airfoil comprising: an aerodynamically continuous upper surface of the airfoil connected at its inner-end to fixed structure of the airfoil; a rib member fixedly hinged at its inner-end to fixed structure of the airfoil for rotation in a chordwise plane and having its free-end extending outwardly therefrom toward the edge of the airfoil; a linkage mechanism connecting the outer-end of said upper surface with the free-end of the rib member; means for rotating the rib member about its hinged inner-end; means operatively associated with the means that impart rotational movement to the rib member for producing a kinematic motion in said linkage mechanism so as to controllably bend the upper surface and in combination, torsionally twist the outer-end of said upper surface about a relatively spanwise axis to impart a flexuous curvature thereto and thereby vary the camber of the airfoil; said linkage mechanism comprises two mechanical linkages spaced apart chordwise and interconnecting the upper surface with the rib member, the upper surface structure between said chordwise spaced linkages forming one link, the rib member structure between said chordwise spaced linkages forming another link, and said two mechanical linkages forming the remainder of the linkage mechanism; said linkage mechanism being slaved to the rotating means of the rib member for torsionally twisting the outer-end portion of the upper surface so as to flexuously bend the upper surface and thereby vary the camber of the airfoil.

3. A variable camber airfoil comprising: an aerodynamically continuous upper surface of the airfoil connected at its inner-end to fixed structure of the airfoil; a rib member fixedly hinged at its inner-end to fixed structure of the airfoil for rotation in a chordwise plane and having its free-end extending outwardly therefrom toward the edge of the airfoil; a linkage mechanism connecting the outer-end of said upper surface with the free-end of the rib member; means for rotating the rib member about its hinged inner-end; means operatively associated with the means that impart rotational movement to the rib member for producing a kinematic motion in said linkage mechanism so as to controllably bend the upper surface and in combination, torsionally twist the outer-end of said upper surface about a relatively spanwise axis to impart a flexuous curvature thereto and thereby vary the camber of the airfoil; said linkage mechanism connecting the upper surface with the free-end of the rib member comprises a pair of linkage elements spaced apart chordwise and forming a four-bar linkage arrangement wherein, the structure in the upper surface between the chordwise spaced connections of the pair of linkage elements forms one bar, the rib member structure between the chordwise spaced connections of the pair of linkage elements forms the other bar, and the pair of linkage elements form the remaining bars.

4. A variable camber airfoil, comprising: an airfoil edge forming structure; an aerodynamically continuous upper surface flexible skin panel having its outer-end rigidly fastened to the airfoil edge forming structure and its inner-end connected to fixed structure of the airfoil; a rib member fixedly hinged at its inner-end to fixed structure of the airfoil for rotation in a chordwise plane and having its free-end extending outwardly therefrom toward the airfoil edge forming structure; means connecting the airfoil edge forming structure with the free-end of the rib member such that the rib member supports the airfoil edge forming structure and said upper surface flexible skin panel independently of the structural continuity of said upper surface flexible skin panel; means for rotating the rib member about its hinged inner-end to pull down on the airfoil edge forming structure; and means operatively associated with the means that impart rotational movement to the rib member for producing a motion in said means connecting said airfoil edge forming structure with the free-end of the rib member so as to controllably bend the upper surface panel in combination with torsionally rotating the airfoil leading edge structure about a relatively spanwise axis to flexuously bend the upper surface flexible skin panel and thereby vary the camber of the airfoil.

5. A variable camber airfoil, comprising: an airfoil edge forming structure; an aerodynamically continuous upper surface flexible skin panel having its outer-end rigidly fastened to the airfoil edge forming structure and its inner-end connected to fixed structure of the airfoil; a rib member fixedly hinged at its inner-end to fixed structure of the airfoil for rotation in a chordwise plane and having its free-end extending outwardly therefrom toward the airfoil edge forming structure; a linkage mechanism connecting the airfoil edge forming structure with the free-end of the rib member; means for rotating the rib member about its hinged inner-end to pull down on the airfoil edge forming structure; means operatively associated with the means that impart rotational movement to the rib member for producing a kinematic motion in said linkage mechanism so as to controllably bend the upper surface panel in combination with torsionally rotating the airfoil leading edge structure about a relatively spanwise axis to flexuously bend the upper surface flexible skin panel and thereby vary the camber of the airfoil; said linkage mechanism comprises two mechanical linkages spaced apart chordwise and interconnecting the airfoil edge forming structure with the rib member, the airfoil edge forming structure between said chordwise spaced linkages forming one link, the rib member structure between said chordwise spaced linkages forming another link, and said two mechanical linkages forming the remainder of the linkage mechanism; and said linkage mechanism being slaved to the rotating means of the rib member for torsionally twisting the outer-end portion of the upper surface panel so as to flexuously bend it and thereby vary the camber of the airfoil.

6. A variable camber airfoil, comprising: an airfoil edge forming structure; an aerodynamically continuous upper surface flexible skin panel having its outer-end rigidly fastened to the airfoil edge forming structure and its inner-end connected to fixed structure of the airfoil; a rib member fixedly hinged at its inner-end to fixed structure of the airfoil for rotation in a chordwise plane and having its free-end extending outwardly therefrom toward the airfoil edge forming structure; a linkage mechanism connecting the airfoil edge forming structure with the free-end of the rib member; means for rotating the rib member about its hinged inner-end to pull down on the airfoil edge forming structure; and means operatively associated with the means that impart rotational movement to the rib member for producing a kinematic motion in said linkage mechanism so as to controllably bend the upper surface panel in combination with torsionally rotating the airfoil leading edge structure about a relatively spanwise axis to flexuously bend the upper surface flexible skin panel and thereby vary the camber of the airfoil; said linkage mechanism connecting the airfoil edge forming structure with the free-end of the rib member comprises a pair of linkage elements spaced apart chordwise and forming a four-bar linkage arrangement wherein, the structure in the airfoil edge forming structure between the chordwise spaced connections of the pair of linkage elements forms one bar, the rib member structure between the chordwise spaced connections of the pair of linkage elements forms the other bar, and the pair of linkage elements form the remaining bars.

7. A variable camber apparatus for an airfoil having a chord reference plane, comprising an aerodynamically continuous upper surface skin panel having its inner-end connected to fixed structure of the airfoil; an airfoil edge forming structure rigidly fastened to the outer edge of said panel; a chordwise rib beam member pivotally connected at one end portion to rigid structure of the airfoil and having its free-end portion extending outwardly chordwise to the airfoil edge forming structure; said chordwise rib beam member and said airfoil edge forming structure each having a chordwise reference line coincident with the airfoil chord reference plane when the apparatus for varying the camber of the airfoil is at its noncambering position; means connecting the airfoil edge forming structure with the free-end portion of the rib beam member such that the chordwise rib beam member supports the airfoil edge forming structure and the upper surface skin panel independently of the structural continuity of said upper surface skin panel; means for rotating the rib beam member about its aft-end portion in a plane normal to the airfoil chord reference plane and about a relatively spanwise axis fixed with respect to the rigid structure; means operatively associated with the means that impart rotational movement to the rib beam member for slaving the rotational movement of the airfoil edge forming structure to the rotational movement of the rib beam member so that the airfoil edge forming structure is rotated at a greater angular rate than that of the chordwise rib beam member such that the chordwise reference line of the airfoil edge forming structure is at a greater angular deflection from the airfoil chord reference plane than that of the chordwise rib beam member for controllably bending the upper surface panel in combination with imparting a torsional twist about a relatively spanwise axis to the outer edge portion of the airfoil upper surface flexible skin panel through its rigid attachment to the airfoil edge forming structure so as to flexuously bend said panel and thereby vary the camber of the airfoil.

8. A variable camber apparatus for an airfoil having a chord reference plane, comprising an aerodynamically continuous upper surface skin panel having its inner-end connected to fixed structure of the airfoil; an airfoil edge forming structure rigidly fastened to the outer edge of said panel; a chordwise rib beam member pivotally connected at one end portion to rigid structure of the airfoil and having its free-end portion extending outwardly chordwise to the airfoil edge forming structure; said chordwise rib beam member and said airfoil edge forming structure each having a chordwise reference line coincident with the airfoil chord reference plane when the apparatus for varying the camber of the airfoil is at its noncambering position; a linkage mechanism connecting the airfoil edge forming structure with the free-end portion of the rib beam member; means for rotating the rib beam member about its aft-end portion in a plane normal to the airfoil chord reference plane and about a relatively spanwise axis fixed with respect to the rigid structure; means operatively associated with the means that impart rotational movement to the rib beam member for slaving the rotational movement of the airfoil edge forming structure to the rotational movement of the rib beam member so that the airfoil edge forming structure is rotated at a greater angular rate than that of the chordwise rib beam member such that the chordwise reference line of the airfoil edge forming structure is at a greater angular deflection from the airfoil chord reference plane than that of the chordwise rib beam member for controllably bending the upper surface panel in combination imparting a torsional twist about a relatively spanwise axis to the outer edge portion of the airfoil upper surface flexible skin panel through its rigid attachment to the airfoil edge forming structure so as to flexuously bend said panel and thereby vary the camber of the airfoil; said linkage mechanism comprises two mechanical linkages spaced apart chordwise and interconnecting the airfoil edge forming structure with the chordwise rib beam member, the airfoil edge forming structure between said chordwise spaced linkages forming one link, the chordwise rib beam member structure between said chordwise spaced linkages forming another link, and said two mechanical linkages forming the remainder of the linkage mechanism; and said linkage mechanism being slaved to the rotating means of the rib beam member.

9. A variable camber apparatus for an airfoil having a chord reference plane, comprising an aerodynamically continuous upper surface skin panel having its inner-end connected to fixed structure of the airfoil; an airfoil edge forming structure rigidly fastened to the outer edge of said panel; a chordwise rib beam member pivotally connected at one end portion to rigid structure of the airfoil and having its free-end portion extending outwardly chordwise to the airfoil edge forming structure, said chordwise rib beam member and said airfoil edge forming structure each having a chordwise reference line coincident with the airfoil chord reference plane when the apparatus for varying the camber of the airfoil is at its noncambering position; a linkage mechanism connecting the airfoil edge forming structure with the free-end portion of the rib beam member; means for rotating the rib beam member about its aft-end portion in a plane normal to the airfoil chord reference plane and about a relatively spanwise axis fixed with respect to the rigid structure means operatively associated with the means that impart rotational movement to the rib beam member for slaving the rotational movement of the airfoil edge forming structure to the rotational movement of the rib beam member so that the airfoil edge forming structure is rotated at a greater angular rate than that of the chordwise rib beam member such that the chordwise reference line of the airfoil edge forming structure is at a greater angular deflection from the airfoil chord reference plane than that of the chordwise rib beam member for controllably bending the upper surface panel in combination with imparting a torsional twist about a relatively spanwise axis to the outer edge portion of the airfoil upper surface flexible skin panel through its rigid attachment to the airfoil edge forming structure so as to flexuously bend said panel and thereby vary the camber of the airfoil; said linkage mechanism connecting the airfoil edge forming structure with the free-end portion of the rib member comprises a pair of linkage elements spaced apart chordwise and forming a four-bar linkage arrrangement wherein, the structure in the airfoil edge forming structure between the chordwise spaced connections of the pair of linkage elements forms one bar, the chordwise rib beam member structure between the chordwise spaced connections of the pair of linkage elements forms the other bar, and the pair of linkage elements form the remaining bars.

10. A variable camber wing airfoil comprising: an aerodynamically continuous upper surface of the wing airfoil connected at its inner-end to fixed structure of the wing airfoil; a rib member fixedly hinged at its inner-end to fixed structure of the wing airfoil for rotation in a chordal plane and having its free-end extending outwardly therefrom toward the spanwise edge of the wing airfoil; means interconnecting the outerend of said upper surface with the free-end of the rib member such that the rib member supports the upper surface independently of the structural continuity of said upper surface; actuating means for rotating the rib member; and means for slaving the movement of said interconnecting means to the actuating means that impart rotational movement to the rib member, such that the upper surface is controllably bent in combination with torsionally twisting the outer-end of said upper surface about a relative spanwise axis to produce an external curvilinear contour thereto.

11. A variable camber wing airfoil comprising: an aerodynamically continuous upper surface of the wing airfoil connected at its inner-end to fixed structure of the wing airfoil; a rib member fixedly hinged at its inner-end to fixed structure of the wing airfoil for rotation in a chordal plane and having its free-end extending outwardly therefrom toward the spanwise edge of the wing airfoil; a pair of linkage elements interconnecting the outer-end of said upper surface with the free-end of the rib member; actuating means for rotating the rib member and means for slaving the movement of the pair of linkage elements to the actuating means that impart rotational movement to the rib member, such that the upper surface is controllably bent in combination with torsionally twisting the outer-end of said upper surface about a relative spanwise axis to produce an external curvilinear contour thereto, which provides an aerodynamically predetermined increase in camber to the wing airfoil; said pair of linkage elements being spaced apart chordwise to form a four-bar linkage arrangement wherein, the structure in the upper surface between the chordwise spaced connections of the pair of linkage elements forms on bar, the rib member structure between the chordwise spaced connections of the pair of linkage elements forms the other bar, and the pair of linkage elements form the remaining bars.

12. A variable camber airfoil having a rigid mid-portion and an angularly displaceable portion extending outwardly chordwise therefrom, comprising: an aerodynamically continuous bendable upper skin panel connected spanwise along its inner edge to fixed structure of the airfoil mid-portion; an airfoil edge forming structure rigidly fastened to the outer edge of the bendable upper skin panel; a rib member fixedly hinged at one end to the rigid mid-portion of the airfoil and having its free-end extending outwardly chordwise therefrom; connecting means spaced chordwise between the airfoil edge forming structure and the free-end of the rib member such that the rib member supports the airfoil edge forming structure and the bendable upper skin panel independently of the structural continuity of said bendable upper skin panel; actuating means for rotating the rib member about its hinged connection to swing the free-end of the rib member down, and through said connecting means bend the upper skin panel; and means for slaving the movement of said connecting means to the actuating means effecting rotation of the rib member, such that the upper skin panel is torsionally flexed to provide an aerodynamically predetermined external curvilinear contour thereto.

13. A variable camber airfoil having a rigid mid-portion and an angular displaceable portion extending outwardly chordwise therefrom, comprising: an aerodynamically continuous bendable upper skin panel connected spanwise along its inner edge to fixed structure of the airfoil mid-portion; an airfoil edge forming structure rigidly fastened to the outer edge of the bendable upper skin panel; a rib member fixedly hinged at one end to the rigid mid-portion of the airfoil and having its free-end extending outwardly chordwise therefrom; a pair of linkage elements spaced chordwise and providing pivotal connections between the airfoil edge forming structure and the free-end of the rib member; actuating means for rotating the rib member about its hinged connection to swing the free-end of the rib member down, and through the interconnecting pair of linkage elements, bend the upper skin panel; and means for slaving the movement of the pair of linkage elements to the actuating means effecting rotation of the rib member, such that the upper skin panel is torsionally flexed to provide an aerodynamically predetermined external curvilinear contour thereto, for increasing the camber of the airfoil; said pair of linkage elements forming a four-bar linkage arrangement wherein, the airfoil edge forming structure between the chordwise spaced pivotal connections of the pair of linkage elements forms one bar, the rib member chordwise structure between pivotal connections of the pair of linkage elements forms the other bar, and the pair of linkage elements form the remaining bars.

14. A variable camber airfoil having a rigid mid-portion and an angular displaceable portion extending outwardly chordwise therefrom having a spanwise edge forming structure along the outermost chordwise edge of the airfoil, said airfoil comprising: a bendable upper skin panel connected spanwise along its inner edge to fixed structure of the airfoil mid-portion and rigidly fastened spanwise along the outermost edge of the airfoil to the spanwise edge forming structure; said bendable upper skin panel forming a continuation of the upper surface of the airfoil; a rib member hinged for support at its inner-end adjacent to the upper surface of the airfoil to fixed structure of the airfoil mid-portion and with its free-end projecting chordwise outwardly from the airfoil mid-portion; a pair of linkage elements spaced chordwise and interconnecting the outwardly projecting free-end of the rib member, with the spanwise edge forming structure; said pair of linkage elements forming a four-bar linkage arrangement wherein, the spanwise edge forming structure between the chordwise spaced pivotal connections of the pair of linkage elements forms one bar, the rib member chordwise structure between pivotal connections of the pair of linkage elements forms the other bar, and the pair of linkage elements form the remaining bars; actuating means for effecting rotation of the rib member about a relatively spanwise axis fixed with respect to the fixed structure to bend the upper skin panel and means for slaving the movement of the four-bar linkage elements to the actuating means effecting rotation of the rib member, such that the bendable upper skin panel is torsionally flexed to provide an aerodynamically predetermined external curvilinear contour thereto, thereby, increasing efficiency of the airfoil camber.

15. A variable camber apparatus for the leading edge portion of an airfoil, comprising: an aerodynamically continuous upper surface flexible skin panel of the airfoil connected at its inner-end to fixed structure of the airfoil; a rib member having an aft-end fixedly hinged to fixed structure of the airfoil for rotation in a chordwise plane and having a forward-end extending toward the leading edge of the airfoil; means connecting a leading edge portion of the upper surface panel with the forward-end of the rib member such that the rib member supports said leading edge portion independently of the structural continuity of said upper surface flexible skin panel; means for rotating the rib member about its hinged aft-end; means operatively associated with the means that impart rotational movement to the rib member for producing a motion in said means connecting the leading edge portion with the forward-end of the rib member so as to controllably bend the upper surface panel in combination with torsionally twisting the leading edge portion of the upper surface panel about a relatively spanwise axis, so as to impart a flexuous curvature thereto and thereby vary the camber of the airfoil.

16. A variable camber apparatus for the leading edge portion of an airfoil, comprising: an aerodynamically continuous upper surface flexible skin panel of the airfoil connected at its inner-end to fixed structure of the airfoil; a rib member having an aft-end fixedly hinged to fixed structure of the airfoil for rotation in a chordwise plane and having a forward-end extending toward the leading edge of the airfoil, a linkage mechanism connecting a leading edge portion of the upper surface panel with the forward-end of the rib member; means for rotating the rib member about its hinged aft-end; means operatively associated with the means that impart rotational movement to the rib member for producing a kinematic motion in said linkage mechanism so as to controllably bend the upper surface panel in combination with torsionally twisting the leading edge portion of the upper surface panel about a relatively spanwise axis, so as to impart a flexuous curvature thereto and thereby vary the camber of the airfoil; said linkage mechanism comprises a pair of linkage elements spaced apart chordwise and forming a four-bar linkage arrangement wherein, the structure in the upper surface between the chordwise spaced connection of the pair of linkage elements forms one bar, the rib member structure between the chordwise spaced connections of the pair of linkage elements forms the other bar, and the pair of linkage elements form the remaining bars.

17. A variable camber apparatus for the leading edge portion of an airfoil, comprising: a leading edge nose structure; an aerodynamically continuous bendable upper surface panel having a forward-end rigidly fastened to the leading edge nose structure; a chordwise rib beam member having a aft-end portion hinged to fixed support structure of the airfoil for rotation in a chordwise plane about a relatively spanwise axis fixed with respect to the fixed structure and having a forward-end portion extending to the leading edge nose structure; means connecting the leading edge nose structure with the forward-end portion of the rib beam member such that the rib beam member supports the leading edge nose structure and the bendable upper surface panel independently of the structural continuity of said bendable upper surface panel; means for rotating the rib beam member about its hinged aft-end portion; means operatively associated with the means that impart rotational movement to the rib beam member for slaving the rotational movement of the leading edge nose structure to the rotational movement of the rib beam member so as to controllably bend the upper surface panel and in combination, torsionally rotate the leading edge nose structure about a relatively spanwise axis to impart a flexuous curvature into said panel to thereby vary the camber of the airfoil.

18. A variable camber apparatus for the leading edge portion of an airfoil, comprising: a leading edge nose structure; an aerodynamically continuous bendable upper surface panel having a forward-end rigidly fastened to the leading edge nose structure; a chordwise rib beam member having an aft-end portion fixedly hinged to fixed support structure of the airfoil for rotation in a chordwise plane about a relatively spanwise axis and having a forward-end portion extending to the leading edge nose structure; a linkage mechanism connecting the leading edge nose structure with the forward-end portion of the rib beam member; means for rotating the rib beam member about its hinged aft-end portion; means operatively associated with the means that impact rotational movement to the rib beam member for slaving the rotational movement of the leading edge nose structure to the rotational movement of the rib beam member so as to controllably bend the upper surface panel and in combination, torsionally rotate the leading edge nose structure about a relatively spanwise axis to impart a flexuous curvature into said panel to thereby vary the camber of the airfoil; said linkage mechanism connecting the leading edge nose structure with the forward-end portion of the rib beam member, comprises a pair of linkage elements spaced apart chordwise and forming a four-bar linkage arrangement wherein, the structure in the upper surface between the chordwise spaced connections of the pair of linkage elements forms one bar, the rib member structure between the chordwise spaced connections of the pair of linkage elements forms the other bar, and the pair of linkage elements form the remaining bars.

19. A variable camber apparatus for the leading edge portion of an airfoil having a chord reference plane, comprising: a leading edge nose structure, a bendable upper surface having a forward-end rigidly fastened to the leading edge nose structure and an aft-end connected to fixed structure of the airfoil; a chordwise rib beam member having an aft-end portion pivotally connected to fixed structure of the airfoil for rotation in a plane normal to the airfoil chord reference plane about a relatively spanwise axis fixed with respect to the fixed structure and having a forward-end portion extending to the leading edge nose structure; said chordwise rib beam member and said leading edge nose structure each having a chordwise reference line coincident with the airfoil chord reference plane when the apparatus for varying the camber of the airfoil is at its noncambering position; means connecting the leading edge nose structure with the forward-end portion of the rib beam member such that the rib beam member supports the leading edge nose structure and the bendable upper surface independently of the structural continuity of said bendable upper surface; means for rotating the rib beam member about its aft-end portion; means operatively associated with the means that impart rotational movement to the rib beam member for slaving the rotational movement of the leading edge nose structure to the rotational movement of the rib beam member so that the leading edge nose structure is rotated at a greater angular rate than that of the chordwise rib beam member such that the chordwise reference line of the leading edge nose structure is at a greater angular deflection from the airfoil chord reference plane than that of the chordwise rib beam member for controllably bending the upper surface in combination with imparting a torsional twist about a relatively spanwise axis to the leading edge portion of the bendale upper surface through its rigid attachment to the leading edge nose structure so as to flexuously bend said upper surface and thereby vary the camber of the airfoil.

20. A variable camber apparatus for the leading edge portion of an airfoil having a chord reference plane, comprising: a leading edge nose structure; a bendable upper surface having a forward-end rigidly fastened to the leading edge nose structure and an aft-end connected to fixed structure of the airfoil; a chordwise rib beam member having an aft-end portion pivotally connected to fixed structure of the airfoil for rotation in a plane normal to the airfoil chord reference plane about a relatively spanwise axis fixed with respect to the fixed structure and having a forward-end portion extending to the leading edge nose structure; said chordwise rib beam member and said leading edge nose structure each having a chordwise reference line coincident with the airfoil chord reference plane when the apparatus for varying the camber of the airfoil is at its noncambering position; a linkage mechanism connecting the leading edge nose structure with the forward-end portion of the rib beam member; means for rotating the rib beam member about its aft-end portion; means operatively associated with the means that impart rotational movement to the rib beam member for slaving the rotational movement of the leading edge nose structure to the rotational movement of the rib beam member so that the leading edge nose structure is rotated at a greater angular rate than that of the chordwise rib beam member such that the chordwise reference line of the leading edge nose structure is at a greater angular deflection from the airfoil chord reference plane than that of the chordwise rib beam member for controllably bending the upper surface in combination with imparting a torsional twist about a relatively spanwise axis to the leading edge portion of the bendable upper surface through its rigid attachment to the leading edge nose structure so as to flexuously bend said uppper surface and thereby vary the camber of the airfoil; said linkage mechanism connecting the leading edge nose structure with the forward-end portion of the rib beam member, comprises a pair of linkage elements spaced apart chordwise and forming a four-bar linkage arrangement wherein, the structure in the upper surface between the chordwise spaced connections of the pair of linkage elements forms one bar, the rib member structure between the chordwise spaced connections of the pair of linkage elements forms the other bar, and the pair of linkage elements form the remaining bars.

21. A variable camber apparatus for the leading edge portion of an airfoil, comprising: a leading edge nose structure; a bendable upper surface having an inner-end connected to rigid structure of the airfold and an outer-end rigidly fastened to the leading edge of the nose structure; a rib member pivotally mounted about its aft-end to rigid structure of the airfoil; interconnecting means between the leading edge nose structure and the rib member for supporting the leading edge nose structure and the bendable upper surface independently of the structural continuity of said bendable upper surface; actuating means for rotating the rib member about its aft, fixed, pivotal support to bend the upper surface; and means for slaving the movement of said interconnecting means to the rotational movement of the rib member for torsionally rotating the leading edge nose structure to control the curvilinear contour of the bendable upper surface and provide an aerodynamically predetermined increase in camber to the airfoil.

22. A variable camber apparatus for the leading edge portion of an airfoil, comprising: a leading edge nose structure; a bendable upper surface having an inner-end connected to rigid structure of the airfoil and an outer-end rigidly fastened to the leading edge of the nose structure; a rib member pivotally mounted about its aft-end to rigid structure of the airfoil, nose linkage means interconnecting the leading edge nose structure with the rib member; actuating means for rotating the rib member about it aft, fixed, pivotal support to bend the upper surface; and means for slaving the movement of the nose linkage means to the rotational movement of the rib member for torsionally rotating the leading edge nose structure to control the curvilinear contour of the bendable upper surface for providing an aerodynamically predetermined increase in camber to the airfoil; said nose linkage means, comprises a pair of linkage elements spaced apart chordwise and forming a four-bar linkage arrangement wherein, the structure in the upper surface between the chordwise spaced connections of the pair of linkage elements forms one bar, the rib member structure between the chordwise spaced connections of the pair of linkage elements forms the other bar, and the pair of linkage elements forms the remaining bars.

23. A variable camber apparatus for the leading edge portion of an airfoil having a rigid mid-portion and an angular displaceable portion extending forwardly chordwise therefrom, comprising: a bendable upper skin panel connected spanwise along its aft-edge to fixed structure of the airfoil mid-portion; an airfoil leading edge forming structure rigidly fastened to the forward edge of the bendable upper skin panel; a rib member fixedly hinged at its inner-end to the rigid mid-portion of the airfoil and having its free-end extending forwardly chordwise therefrom; interconnecting means between the airfoil leading edge forming structure and the free-end of the rib member for supporting the airfoil leading edge forming structure and the bendable upper skin panel independently of the structural continuity of said bendable upper skin panel; actuating means for rotating the rib member about its hinged connection to swing the free-end of the rib member down and, through the interconnecting means, bend the upper skin panel; and means for slaving the movement of the interconnecting means to the actuating means effecting rotation of the rib member, such that the upper skin panel is torsionally flexed to provide an aerodynamically predetermined external curvilinear contour thereto, for increasing the camber of the airfoil.

24. A variable camber apparatus for the leading edge portion of an airfoil having a rigid mid-portion and an angular displaceable portion extending forwardly chordwise therefrom, comprising: a bendable upper skin panel connected spanwise along its aft-edge to fixed structure of the airfoil mid-portion; an airfoil leading edge forming structure rigidly fastened to the forward edge of the bendable upper skin panel; a rib member fixedly hinged at its inner-end to the rigid mid-portion of the airfoil and having its free-end extending forwardly chordwise therefrom; a pair of linkage elements spaced apart chordwise and providing pivotal connections between the airfoil leading edge forming structure and the free-end of the rib member, actuating means for rotating the rib member about its hinged connection to swing the free-end of the rib member down, and through the interconnecting pair of linkage elements, bend the upper skin panel; and means for slaving the movement of the pair of linkage elements to the actuating means effecting rotation of the rib member, such that the upper skin panel is torsionally flexed to provide an aerodynamically predetermined external curvilinear contour thereto, for increasing the camber of the airfoil; said pair of linkage elements form a four-bar linkage arrangement wherein, the airfoil leading edge forming structure between the chordwise spaced pivotal connections of the pair of linkage elements forms one bar, the rib member chordwise structure between pivotal connections of the pair of linkage elements forms the other bar, and the pair of linkage elements form the remaining bars.

25. A variable camber apparatus for the leading edge portion of an airfoil having a rigid mid-portion and an angular displaceable portion extending forwardly chordwise therefrom having an airfoil leading edge forming structure, comprising: a bendable upper skin panel connected spanwise along its aft-edge to fixed structure of the airfoil mid-portion and rigidly attached spanwise along its forward edge to the airfoil leading edge forming structure; said bendable upper skin panel forming a forward continuation of the upper surface of the airfoil mid-portion; a contractable lower surface; a rib member hinged for support at its aft-end, adjacent to the upper surface of the airfoil, to fixed structure of the airfoil mid-portion and having a forward-end projecting toward the leading edge of the airfoil; a pair of linkage elements spaced apart chordwise and interconnecting the forward projecting end of the rib member, with the airfoil leading edge forming structure; said pair of linkage elements forming a four-bar linkage arrangement wherein, the airfoil leading edge forming structure between the chordwise spaced connections of the pair of linkage elements forms one bar, the rib member structure between the chordwise spaced connections of the pair of linkage elements forms the other bar, and the pair of linkage elements form the remaining bars; actuating means for effecting rotation of the rib member about a fixed spanwise axis to bend the upper skin panel and contract the lower surface; and means for slaving the movement of the four-bar linkage elements, to the actuating means effecting rotation of the rib member, such that the bendable upper skin panel controllably flexed torsionally to provide an aerodynamically predetermined external curvilinear contour thereto, thereby, efficiently increasing the camber of the airfoil.

* * * * *